United States Patent [19]

Graze, Jr.

[11] Patent Number: 5,024,193
[45] Date of Patent: Jun. 18, 1991

[54] FUEL COMBUSTION SYSTEM, METHOD, AND NOZZLE MEMBER THEREFOR

[75] Inventor: Russell R. Graze, Jr., Dunlap, Ill.
[73] Assignee: Caterpillar Inc., Peoria, Ill.
[21] Appl. No.: 475,517
[22] Filed: Feb. 6, 1990
[51] Int. Cl.[5] .............................................. F02B 19/18
[52] U.S. Cl. ..................................... 123/259; 123/283; 123/293
[58] Field of Search .............. 123/259, 286, 293, 269, 123/266, 282, 283

[56] References Cited

U.S. PATENT DOCUMENTS

| | | | |
|---|---|---|---|
| 1,271,942 | 7/1918 | Richardo | 123/255 |
| 1,700,903 | 2/1929 | Marburg | 123/293 X |
| 2,153,598 | 4/1939 | Steward | 123/169 V |
| 2,173,081 | 9/1939 | Barkeij | 123/275 |
| 3,406,667 | 10/1968 | Evans et al. | 123/286 X |
| 3,985,111 | 10/1976 | Turkish | 123/254 |
| 4,140,090 | 2/1979 | Lindberg | 123/277 X |
| 4,144,848 | 3/1979 | Hatanaka | 123/293 |
| 4,147,150 | 4/1979 | Yokota et al. | 123/293 X |
| 4,292,935 | 10/1981 | Wagner | 123/285 |
| 4,294,208 | 10/1981 | Wagner | 123/285 |
| 4,325,334 | 4/1982 | Nishida et al. | 123/286 X |
| 4,534,327 | 8/1985 | Latsch et al. | 123/293 X |

Primary Examiner—Tony M. Argenbright
Attorney, Agent, or Firm—Kenneth A. Rhoads

[57] ABSTRACT

This invention relates to a fuel combustion system for a lean burn internal combustion engine. Because of the lean fuel/air ratio, it is difficult to consistently achieve complete and thorough combustion within the main combustion chamber because of the relatively slow rate of flame propagation. The subject fuel combustion system includes a precombustion chamber assembly defining a prechamber having a preselected shape and volume and includes a plurality of ejection passages. The passages are of a preselected geometric cross-section for directing and controllably expanding burning gases from the prechamber into the main combustion chamber at a velocity greater than the speed of sound in order to penetrate and cause igniting and burning in the main combustion chamber for faster and more complete combustion.

68 Claims, 4 Drawing Sheets

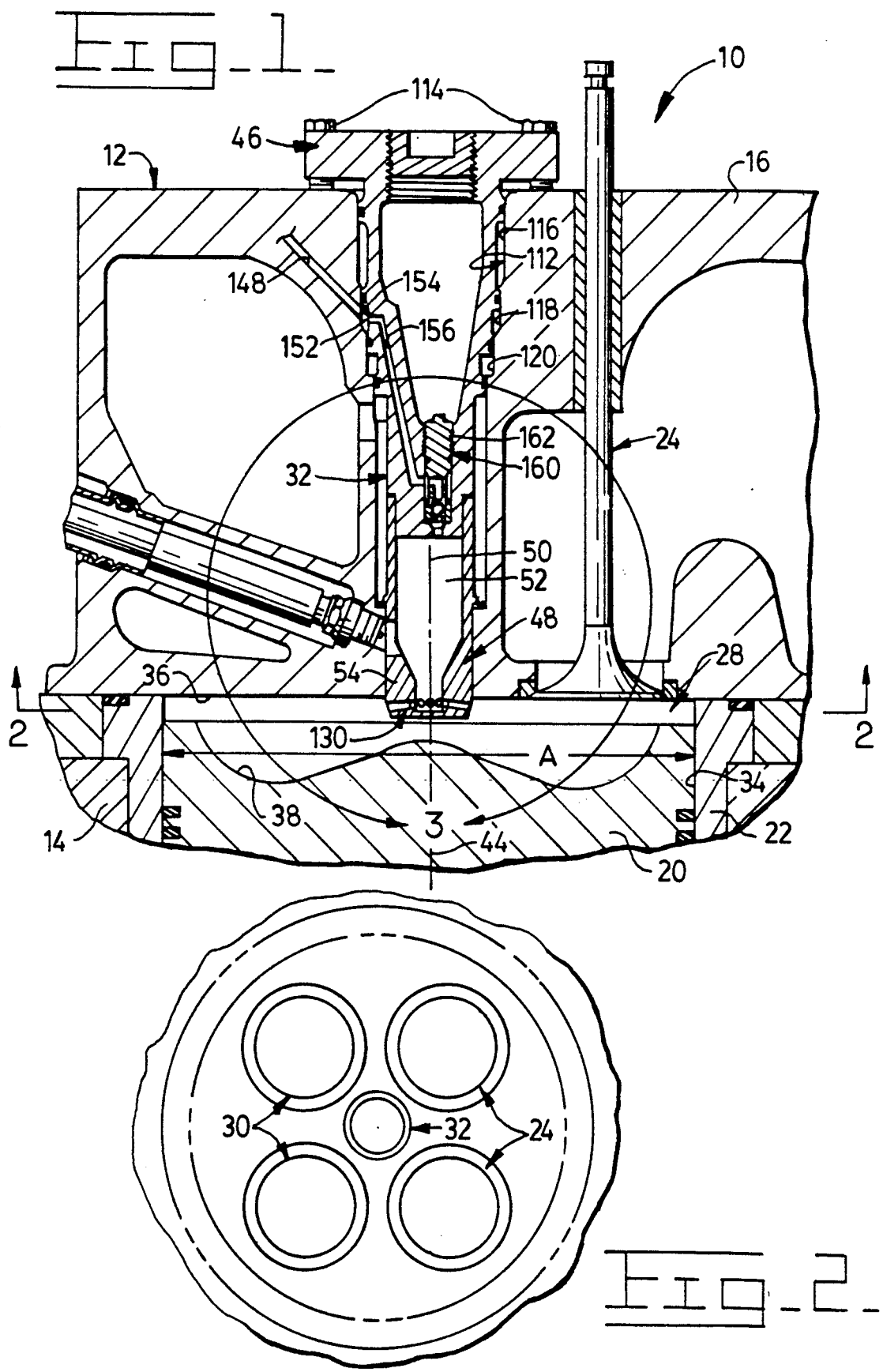

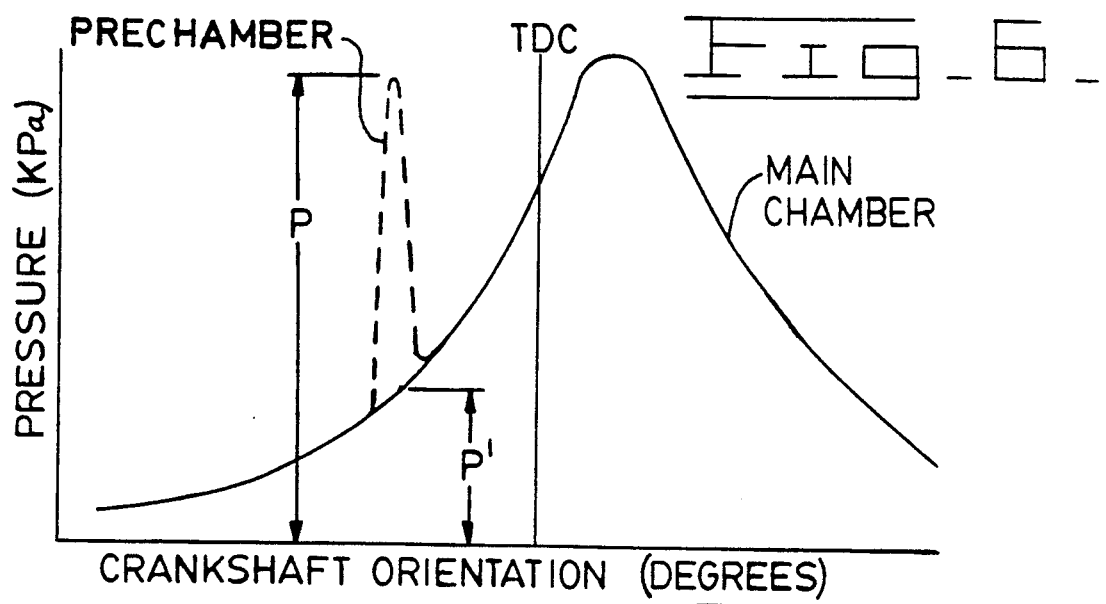
Fig_6_
Fig_7_
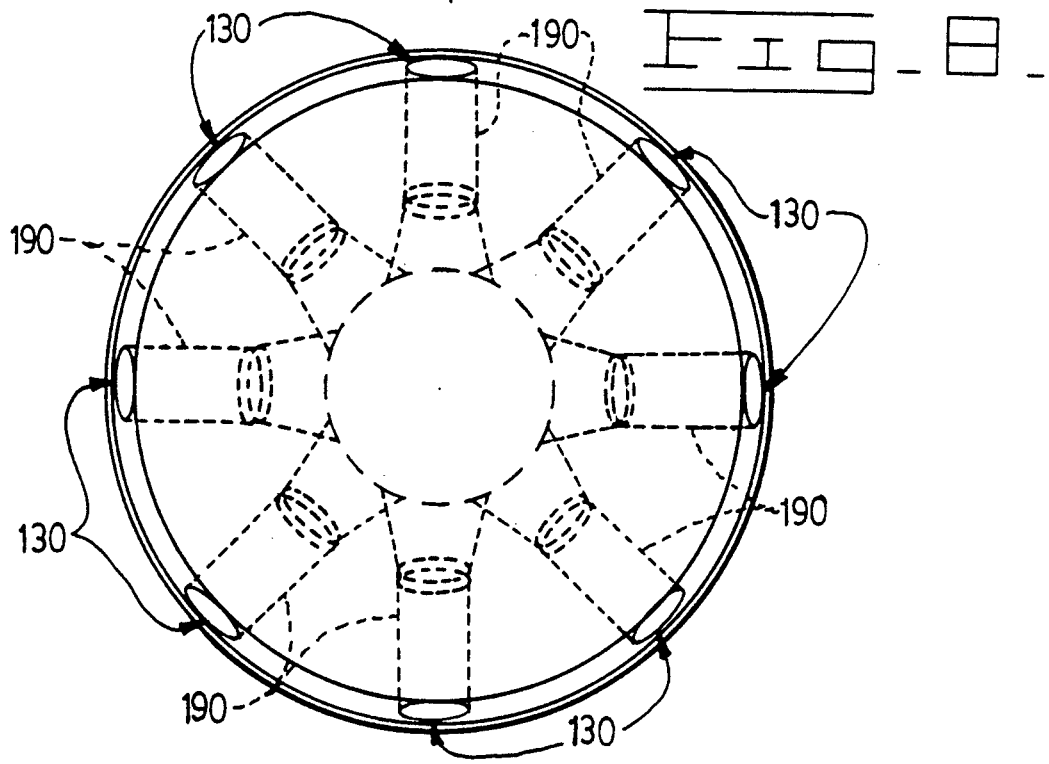
Fig_8_

FUEL COMBUSTION SYSTEM, METHOD, AND NOZZLE MEMBER THEREFOR

DESCRIPTION

1. Technical Field

The present invention relates generally to a fuel combustion system for a gas-burning internal combustion engine, and more particularly to a precombustion chamber assembly defining a prechamber and including a plurality of ejection passages.

2. Background Art

An Otto cycle engine is generally defined as an internal combustion engine which operates on the Otto cycle with sequentially timed preselected phases of intake, compression, power, and exhaust. Such Otto cycle engines include, but are not limited to, 4-stroke-cycle as well as 2-stroke-cycle reciprocating engines. Moreover, in the Otto cycle engines, as herein defined, the fuel and air are pre-mixed generally by a carburetor to form a fairly homogeneous combustible mixture which is admitted to the engine combustion chamber during the intake phase of the cycle.

Control of the power output of an Otto cycle engine is dependent on the mass of the combustible mixture burned in the combustion chamber per cycle. Such control is effected by a throttle, such as a butterfly valve, which variably restricts the amount of combustible mixture without necessarily or significantly changing the fuel/air ratio entering the combustion chamber during the intake phase. During the compression phase, the combustible mixture is compressed within the closed confines of the combustion chamber. Near the end of the compression phase, an ignition device, such as a spark plug or glow plug, ignites the combustible mixture to form hot burning gases which, during the expansion phase of the cycle, expand against a movable piston and thereby create power.

In a stoichiometric version of an Otto cycle engine, nitrogen oxides ($NO_x$) are formed by very high peak temperatures in the combustion chamber. Such high peak temperatures facilitate the oxidation or "burning" of nitrogen with oxygen, both of which are part of the air present in the combustion chamber. The amount of $NO_x$ formed increases with the increased temperature level, increases with the length of time during which the high temperature exists, and also increases with increased concentration of oxygen.

The trend is towards lean-burn (i.e. lean fuel/air ratio) operation of the Otto cycle gas engine in order to significantly reduce the amount of $NO_x$ produced. In the lean-burn gas engine the combustible mixture inducted into the main combustion chamber contains much more air than is necessary to completely burn the fuel. The greater mass of air in the lean combustible mixture keeps the temperature of that burning mixture from rising as high as the temperature produced by burning a stoichiometric combustible mixture having the same amount of fuel. Because the amount of $NO_x$ emissions is directly related to the peak temperatures generated in the combustion chamber, these lean-burn engines produce $NO_x$ levels of about 1 to 2 g/HP-HR compared with $NO_x$ levels of about 20 g/HP-HR produced by the stoichiometric engines.

Because of the lean fuel/air ratio, it is difficult to consistently achieve complete and thorough combustion within the main combustion chamber, especially in large bore engines, with the current ignition devices because of the relatively slow rate of flame propagation from a single point ignition source such as a sparkplug. Under certain conditions, at or near the end of the compression stroke, the pressure and temperature in remote local regions away from the ignition source may be sufficient to cause preignition ahead of flame propagation. In order to prevent this preignition, it is necessary for the flame propagation to reach the remote region rapidly before preignition occurs.

Substantially more electrical energy is required to ignite a lean fuel mixture than is required to ignite a stoichiometric mixture. With the current state of the art high voltage spark plug and glow plug systems it has been difficult to achieve adequate service life.

An appropriately sized precombustion chamber assembly or prechamber can provide substantially greater main chamber ignition capacity. From the prechamber hot, burning products of combustion are discharged through passages as flamefronts into the main combustion chamber to help achieve stable combustion of the very lean combustible mixture. The prechambers typically have a volume equal to about 2 to 5% of the total uncompressed volume of the main combustion chamber and have an ignitor such as a spark plug or glow plug positioned in the prechamber. The lean combustible mixture is admitted to the main combustion chamber during the intake phase and is immediately free to flow into this prechamber. Because the ignitor is a fairly small ignition source, many lean-burn Otto cycle engines also enrich the prechamber with additional fuel from a separate supply source. The very lean fuel/air ratio of the combustible mixture within the main combustion chamber dilutes the very rich prechamber charge thus approaching a stoichiometric mixture which is more readily ignitable. Late in the compression phase, the combustible mixture in the prechamber is ignited by the ignitor. The hot, burning products of combustion are then discharged through the passages as a flamefront into the main combustion chamber where the bulk of the lean combustible mixture is thereby ignited.

However, in instances of very large diameter main combustion chambers, operating at very lean fuel/air ratios, the rate or velocity of the burning product propagation in the main combustion chamber is still relatively slow and the flamefronts do not penetrate completely across the combustion chamber in a timely manner causing incomplete or intermittent combustion. This results in high specific fuel consumption, high hydrocarbon emissions and a very narrow fuel/air ratio operating range. Also the combustion system becomes more sensitive to the physical properties of the fuel with respect to the detonation characteristics, and this limits the range of engine operation and its acceptance in the market place.

Furthermore, it is desirable in ignition-assisted engines to have an operating margin (defined as the percent difference between misfire or unstable speed and detonation) of at least 25 to 30% at rated conditions. This is required so that the engine control system, which is typically mechanical, is able to control the air/fuel ratio safely without entering into undesirable misfire or detonation for a brief period of time. It is also desirable for the brake specific fuel consumption (BSFC) to be fairly constant over a considerable percentage of the operating margin, deteriorating only as the engine approaches misfire.

Accordingly, what is needed is an improved fuel combustion system for a gas burning Otto cycle internal combustion gas engine including a precombustion chamber assembly defining a prechamber and a plurality of passages so constructed and arranged for directing and controllably expanding the hot, burning products of combustion in the prechamber as flamefronts into the main combustion chamber at a rate sufficient to achieve stable combustion of very lean combustible mixtures. The arrangement should take advantage of the pressure ratio between the prechamber and the main combustion chamber converting the enthalpy decrease (through an isentropic expansion) to an increase in kinetic energy through the passages. Such an arrangement should provide enhanced main chamber penetration by the burning gas product at an extremely high velocity with increased turbulence local to the individual flamefronts. The desired effect on main chamber combustion characteristics would be faster and more complete combustion, resulting in reduced hydrocarbon levels, low $NO_x$ more stable operation, and a broader operating margin.

The present invention is directed to overcoming one or more of the problems as set forth above.

DISCLOSURE OF THE INVENTION

In one aspect of the present invention, a fuel combustion system for an engine includes a precombustion chamber assembly defining a prechamber, a source of gaseous fuel for the prechamber and igniting means for igniting a mixture of gaseous combustible air and fuel admitted to the prechamber and forming expanding burning gases. The burning gases are expelled from the prechamber at a velocity greater than the speed of sound.

In another aspect of the invention, a fuel combustion system for a gas engine capable of burning a relatively lean combustible mixture of gaseous fuel and air includes a main combustion chamber and a precombustion chamber assembly. The precombustion chamber assembly includes a head member and a nozzle member cooperatively defining a prechamber, and igniting means for igniting a mixture of combustible fuel admitted to the prechamber forming expanding burning gases. The nozzle member defines a plurality of ejection passage means for directing and controllably expanding the burning gases from the prechamber into the main combustion chamber at a velocity greater than the speed of sound.

In another aspect of the present invention, a nozzle member for a precombustion chamber assembly includes a tubular body defining a cavity. The tubular body includes a first internal surface, a second internal generally conical converging surface, a third reduced diameter internal cylindrical surface and a distal end wall connected in closing relation to the third internal surface. The tubular body defines a plurality of ejection passages, each ejection passage, including a throat portion and an outwardly diverging portion.

In another aspect of the invention, a main combustion chamber for an engine includes a precombustion chamber assembly defining a prechamber. Igniting means is provided for igniting a mixture of combustible fuel in the prechamber and forming expanding burning gases. The nozzle member defines a plurality of ejection passages for directing and controllably expanding the burning gases from the prechamber into the main combustion chamber at a velocity greater than the speed of sound.

In a further aspect of the invention, a method of burning a lean combustible mixture of gaseous fuel and air in an engine including a main combustion chamber, a precombustion chamber assembly defining a prechamber, a plurality of ejection passages and igniting means for igniting a fuel mixture in the prechamber. A relatively lean gaseous mixture of air and fuel is admitted to the main combustion chamber and a gaseous fuel is admitted into the prechamber. The lean gaseous mixture is progressively compressed in the main combustion chamber forcing a portion of the lean mixture radially inwardly through the ejection passages where it is mixed with the fuel in the prechamber. The fuel mixture in the prechamber is ignited forming expanding burning gases. The burning gases from the prechamber are controllably directed into the main combustion chamber at a velocity greater than the speed of sound.

BRIEF DESCRIPTION OF THE DRAWINGS

FIG. 1 is a diagrammatic, fragmentary, cross-sectional side elevational view of a first embodiment of the improved fuel combustion system of the present invention including a precombustion chamber assembly incorporated in an internal combustion engine;

FIG. 2 is a diagrammatic and reduced scale fragmentary bottom view of the cylinder head shown in FIG. 1 taken along the lines 2—2;

FIG. 6 is a graph showing the pressure rise (kPa) in the main combustion chamber (solid line) and the prechamber (broken line) relative to the angular orientation of the crankshaft (degrees) during a portion of the intake and power phases of the Otto cycle;

FIG. 7 is a diagrammatic view similar to FIG. 4, but showing a second embodiment of the precombustion chamber assembly; and FIG. 8 is a diagrammatic end view of the nozzle of FIG. 7.

BEST MODE FOR CARRYING OUT THE INVENTION

Figure 3:
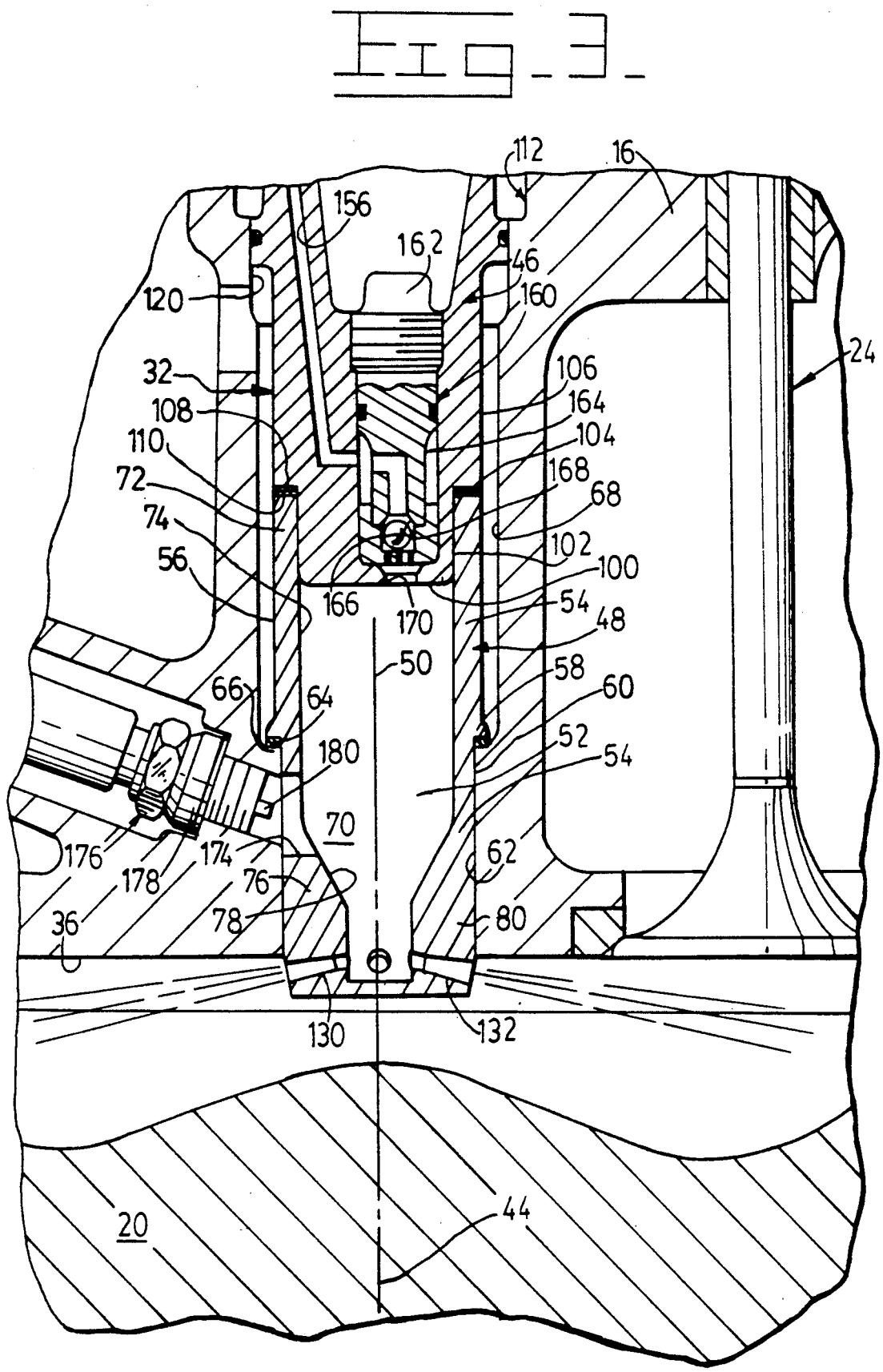
FIG. 3 is a diagrammatic and enlarged fragmentary view taken within the region of line 3 of FIG. 1.

Referring to FIGS. 1-5, there is shown a first exemplary embodiment of an improved fuel combustion system 10 of the present invention. A portion of a spark-ignited, gas-burning internal combustion engine 12 of the Otto cycle type is shown in FIG. 1 including a cylinder block 14, a cylinder head 16 removably secured to the cylinder block, and the fuel combustion system 10 associated with the single cylinder thereof. In this specific instance the engine 12 has a full load speed rating of approximately 1000 rpm, and a compression ratio of approximately 11 to 1.

The fuel combustion system 10 includes a piston 20, a cylinder liner 22, a pair of inlet valves 24 for admitting a predetermined amount of a lean gaseous combustible mixture of air and fuel directly into a main combustion chamber 28 above the piston 20 during an intake phase of the Otto cycle, a pair of exhaust valves 30 for permitting the exhaust of the gases of combustion from the main combustion chamber 28 during an exhaust phase of the Otto cycle, and a precombustion chamber assembly 32. In this specific instance the gaseous combustible mixture includes methane and air, with a main combustion chamber air to fuel ratio of approximately 21 to 1. It is recognized that other gaseous fuels may be used such as ethane, propane, and n-butane with different ignition and burning characteristics and different specific air to fuel ratios.

The cylinder liner 22 is removably secured in the cylinder block 14 and defines a generally cylindrical wall or bore 34 having a diameter "A". A lower surface 36 of the cylinder head 16, the wall 34 and a profiled or crowned upper surface 38 of the piston 20 define the boundaries of the main combustion chamber 28. In the instant embodiment the inlet control valve means 24 includes two conventional inlet valves 40, and the outlet control valve means 30 includes two conventional exhaust valves 42. The intake valves 40 and the exhaust valves 42 are axially movable in the cylinder head 16, and although not illustrated are actuated by a mechanical valve train or other control device in a conventional manner.

The piston 20 has a central axis 44 and is reciprocably guided in the bore 34 of the cylinder liner 22 for compressing and thereby pressurizing the combustible mixture in the main combustion chamber 28 during a compression phase of the Otto cycle. In the specific instance the bore diameter "A" is about approximately 300 mm.

The precombustion chamber assembly 32 is removably secured in the cylinder head 16 and includes a generally cylindrically stepped head member 46 and a generally closed tubular nozzle member 48 having a central axis 50. The members 46 and 48 are preferably made of wrought stainless steel such as Inconel 625. Inconel is a registered trade mark of The International Nickel Company, Inc. The head member 46 and the nozzle member 48 cooperate in their assembled position to define a generally axially oriented, precombustion chamber or prechamber 52 having a preselected geometric shape and volume. The central axis 44 of the piston 20 and the central axis 50 of the nozzle member 48 are preferably axially aligned.

Figure 4:
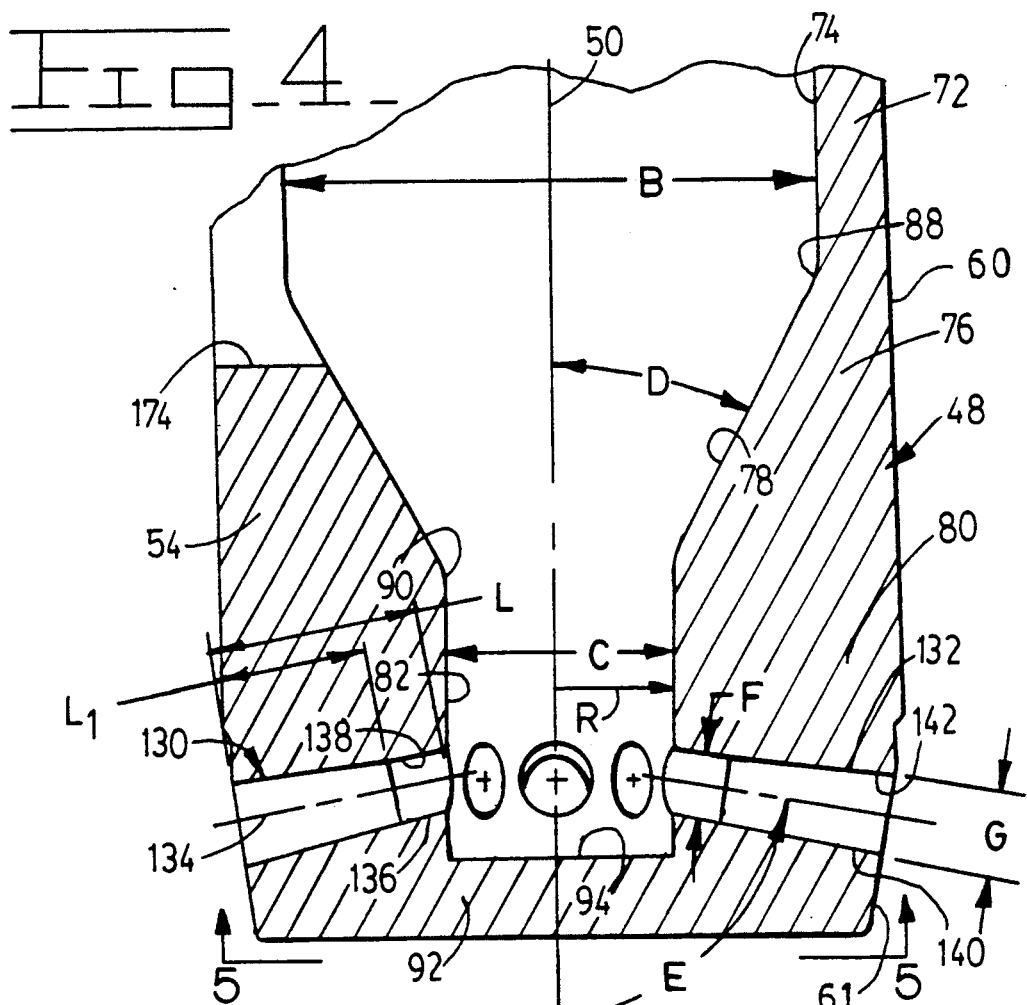
FIG. 4 is a diagrammatic and further enlarged cross-sectional view of the distal end of the nozzle member shown in FIGS. 1, 2 and 3.

As is best illustrated in FIGS. 3 and 4, the nozzle member 48 includes a tubular body 54 having a cylindrical upper outer surface 56, a centrally located outer annular flange 58 defining a ring seat 59, and a cylindrical lower outer surface 60, and a generally conical outer distal surface 61. The outer surface 60 is closely received in a lower bore 62 defined in the cylinder head 16, and an annular sealing ring or gasket 64 is disposed between the ring seat 59 and an annular end surface 66 of an intermediate bore 68 also defined in cylinder head 16.

The tubular body 54 defines an upwardly open cavity 70 and includes an upper tubular wall 72 of a predetermined radial thickness having an internal cylindrical surface 74, an intermediate tubular wall 76 of downwardly increasing sectional thickness having an internal generally conical converging surface 78, and a lower tubular wall 80 of a significant radial thickness greater than the predetermined thickness of the upper tubular wall having an internal reduced diameter cylindrical surface 82. As shown in FIG. 4, the internal cylindrical surface 74 defines a diameter "B" having a first preselected cross-sectional area and the internal reduced diameter cylindrical surface 82 defines a diameter "C" having a radius "R" and defining a second preselected cross-sectional area. The first cross-sectional area is preferably between 3.0 and 6.5 times that of the second cross-sectional area. In this specific instance diameter "B" is approximately 37.3 mm and has a cross-sectional area of approximately 1225.418 mm$^2$ Diameter "C" is approximately 16.0 mm and has a cross-sectional area of approximately 201.062 mm$^2$ which is approximately 6.095 times less than the cross-sectional area of diameter "B".

The conical converging surface 78 is connected to the upper surface 74 by a smoothly blending annular transition surface 88, and is connected to the lower surface 82 also by a smoothly blending annular transition wall surface 90. Preferably, the surfaces 74, 78, 82, 88 and 90 are all surfaces of revolution about the central axis 50. Moreover, the conical converging surface 78 is inclined in cross-section at a preselected angle "D" with respect to the central axis 50 of not less than 25 degrees and is preferably in this specific instance 30 degrees.

The tubular body 54 also has a lower or distal end wall 92 having an internal flat surface 94. The end wall 92 is connected to the lower wall 80 and effectively closing the lower end of the cavity 70. The axial length of the lower internal surface 82 above the end surface 94 is preferably between two and four times the length of the radius "R". The surfaces 74, 78, 82, 84, 88, 90 and 94 are preferably relatively smooth surfaces having a surface texture roughness average (Ra) of about 0.80 micrometers.

Referring now to FIG. 3, the head member 46 has a lower end face surface 100 that effectively closes the upper end of the cavity 70 forming the prechamber 52. The end face surface 100 is preferably relatively smooth having a surface texture roughness average (Ra) of about 0.80 micrometers. The head member 46 further includes a cylindrical piloting surface 102, an annular seal ring seat 104, and a cylindrical surface 106 above the seat. The piloting surface 102 is telescopically received in a close slip-fit relationship in the upper cylindrical surface 74 of the tubular body 54, and an annular steel sealing ring or gasket 108 is disposed between the ring seat 104 of the head member 46 and an annular end face 110 of the nozzle member 48. The head member 46 is sealingly secured in a stepped upper bore 112 defined in the cylinder head 16 by a pair of bolts 114 as shown in FIG. 1. The stepped bore 112 is coaxial with central axis 50 and sealingly includes a first internal cylindrical surface 116, a second internal cylindrical surface 118, and a third internal cylindrical surface 120.

The volume of the prechamber 52 is chosen to be smaller than the volume of the main combustion chamber 28, and is preferably chosen to be about 2 to 5% of the total uncompressed volume of the main combustion chamber. In the subject embodiment the uncompressed volume of the main combustion chamber 28 is approximately 2,119,500 mm$^3$ and the volume of the prechamber 52 is approximately 63,585 mm$^3$ or about 3% of the uncompressed volume of the main combustion chamber.

Figure 5:
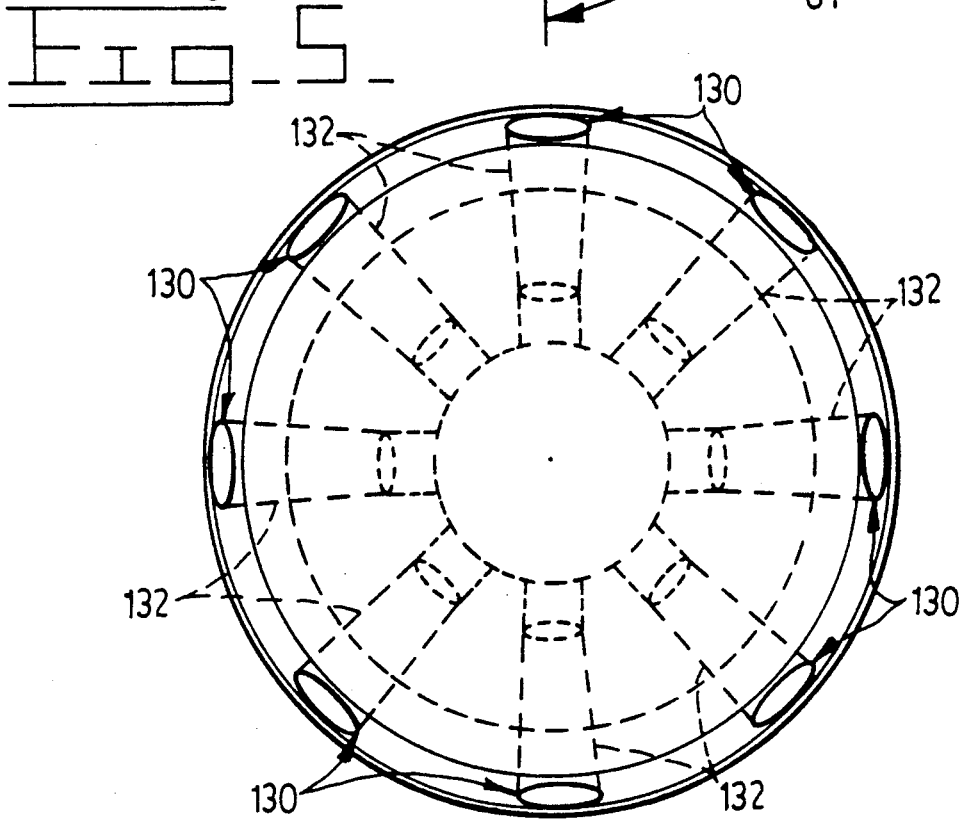
FIG. 5 is a diagrammatic end view of the nozzle shown in FIG. 4 showing a plurality of ejection passages therein.

As best shown in FIGS. 4 and 5 the nozzle member 48 defines ejection passage means 130. The ejection passage means 130 include a plurality of ejection passages 132 having a preselected radially outwardly diverging geometric cross-section in communication with the prechamber 52 for directing and controllably expanding the burning gases away from the prechamber 52 into the main combustion chamber 28 at a velocity greater than the speed of sound in order to penetrate and cause ignition and burning of the combustible mixture in the main combustion chamber in multiple locations simultaneously.

In this specific instance there are eight equally peripherally spaced radial ejection passages 132 individually having a central axis 134 and a preselected axial length "L". Preferably each of the axes 134 is inclined at a preselected angle "E" with respect to the central axis 50 of the nozzle member 48 of between about 65 and 85 degrees, and in this embodiment is approximately 80 degrees. The conical outer distal surface 61 of the nozzle member 48 is substantially normal to the central axis 134. Each ejection passage includes a throat portion 136 having a generally cylindrical internal surface 138 and a conical outwardly diverging portion 140 having a conical internal surface 142 and a preselected length "$L_1$". Preferably the surfaces 138 and 142 are surfaces of revolution about the central axis 134. The surface 138 defines a throat diameter "F" having a preselected cross-sectional area "$A_t$". In this embodiment the throat diameter "F" is approximately 4.50 mm and serves to define a cross-sectional area "$A_t$" of approximately 15.9 mm$^2$. The eight throat areas "$A_t$" have a combined cross-sectional area of approximately 127.2 mm$^2$. The cross-sectional area of the diameter "C" is preferably approximately 1.25 to 1.75 times greater than the combined sum of the cross-sectional areas "$A_t$".

The conical diverging portion 140 defines an exit diameter "G" having a preselected cross-sectional area "$A_e$". In this specific instance the exit diameter "G" is approximately 4.70 mm and defines a cross-sectional area "$A_e$" of approximately 17.34 mm$^2$. The ratio of the throat area "$A_t$" to the exit area "$A_e$" is preferably about 1.01–2.10:1 and in this specific instance the ratio is approximately 1.09:1. The axial length "$L_1$" of the conical diverging portion 140 is preferably more than (1) twice the throat diameter "F"; and (2) less than 85% of the total length "L" of ejection passage 132. In this specific instance the total axial length "L" of the ejection passage 132 is approximately 15 mm, and the axial length "$L_1$" of the conical diverging portion 140 is approximately 11 mm.

The internal surfaces 138 and 142 of the ejection passages 132 are preferably relatively smooth having a surface texture roughness average (Ra) of about 0.80 micrometers.

As shown in FIG. 1, a passage 148 is defined in the cylinder head 16 to admit a gaseous fuel from a separate source, not shown in a conventional manner, to a sealed annular chamber 152 defined by the second internal cylindrical surface 118 of the stepped bore 112 and an annular groove 154 formed about the head member 46. A passage 156 in the head member 46 communicates the gaseous fuel from the chamber 152 to control valve means 160. The control valve means 160 admits a predetermined amount of the fuel at a pressure of 1 to 50 kPa above inlet manifold pressure, depending on engine load and speed. In this specific instance, at full load and speed, the supply pressure is approximately 207 to 241 kPa to the prechamber 52 during the intake phase of the Otto cycle. The valve means 160 prevents the gas product of combustion to flow from the prechamber to the passage 156 during the compression, combustion, and exhaust phases of the Otto cycle.

Referring to FIG. 3, the valve means 160 includes a check valve assembly 162 which is threadably and sealably received in a stepped bore 164 defined in the head member 46. The check valve assembly 162 includes a two-position, free-floating ball check 166 having a first or open mode position permitting the flow of the fuel to the prechamber 52 and a second or closed mode position in which the ball check 166 engages with a conical seat 168 preventing gas flow from the prechamber to the fuel source 150. A passage 170 defined in the head member 46 connects the check valve assembly 162 with the prechamber 52.

A radial passage 174 is formed in the tubular body 54 elevationally substantially at the juncture of the upper tubular wall 72 and the intermediate tubular wall 76. At that location igniting means 176 is provided for igniting the combustible mixture in the prechamber 52 and including a spark plug 178 having an electrode 180. The spark plug is threadably received in the cylinder head 16 with the electrode 180 exposed to the prechamber 52 by way of the passage 174, and is adapted to be electrically energized in a conventional manner.

FIGS. 7 and 8 show a second embodiment of the present invention in which ejection passage means 130 of a modified geometric profile are provided in the nozzle member 48. As in the preceding embodiment there are eight equally peripherally spaced, radially orientated ejection passages 190. The ejection passages 190 are similar to the ejection passages 132 except that each has a converging inlet portion 192 having an internal conical surface 194. The converging inlet surface 194 is a surface of revolution about the central axis 134.

The converging inlet surface 194 is inclined in cross-section at a preselected angle "H" with respect to the central axis 134 between preferably about 15 and 30 degrees and in this embodiment approximately 19 degrees. The surface 194 is preferably relatively smooth having a surface texture roughness average (Ra) of about 0.80 micrometers.

Industrial Applicability

The first step in designing the combustion system 10 for assuring the egress of the expanding burning gases from the prechamber 52 into the main combustion chamber 28 at a velocity greater than the speed of sound is to know the compression ratio of the engine 12, the anticipated excess air ratio in the main combustion chamber 28, the engine boost pressure, and the volume of prechamber 52. With this information the mixture mass, the temperature, the pressure, and the approximate stoichiometric mixture in the prechamber 52 prior to ignition can be determined.

The second step is to calculate the pressure "P" in the prechamber 52 after ignition, assuming no pressure loss through the passage means 130, although in actual practice there would be a pressure loss. FIG. 6 is a graph showing the changes in pressure (kPa) in the main combustion chamber 28 and the prechamber 52 relative to crankshaft orientation (degrees). A firing pressure value "P" of 1.83 times a pressure value "$P^1$" in the main combustion chamber 28, is required to expel the expanding burning gases from the prechamber 52 into the main combustion chamber at a velocity greater than the speed of sound and preferably about 2.5 times the pressure value "$P^1$". With such a firing pressure value "P", it is possible to enhance main combustion chamber penetration and turbulence due to the expanding burning gases by converting the decrease in enthalpy between the prechamber and the main combustion chamber through an isentropic expansion to an increase in kinetic energy corresponding to a velocity increase.

A firing pressure value "P" lower than 1.83 times "$P_1$" cannot be converted into a flow velocity greater than the speed of sound due to the lack of a condition known as choking within the ejection passages 132. Choking is desired and occurs when the theoretical mass flow through the ejection passages 132 is not changed when the pressure on the discharge side of the ejection passages drops below a given value while the upstream pressure is being held constant.

The third step is determining the diameter "F" of throat portion 136. Diameter "F" is sized so that a velocity increase occurs while the flamefront passes through. Sizing is based on, the available combustion mass in the prechamber 52, the desirable short ignition delay values, the maximum desired prechamber to main combustion chamber 28 pressure ratios and fuel/air mixture burning velocities. The filling effectiveness in the ejection passages 132 must be assumed using existing tables. It is critical not to oversize the total throat area "$A_t$" with respect to the burning rate, otherwise choked flow will not be maintained. The total number of ejector passages 132 desired for optimum combustion in the main combustion chamber 28 must be assumed prior to actual determining the diameter "F" of throat portion 136.

The final step involves sizing the exit diameter "G" for optimized discharge at a velocity greater than the speed of sound. The conical diverging portions 140 of the individual ejection passages 132 or 190 allows the burning gas to expand so the gas pressure at the exit diameter "G", referred to as "$P_e$", is approximately the same as the pressure in the main combustion chamber 28 pressure during the ignition and discharge phase. Isentropic expansion is affected through gaseous expansion along the length of the throat portion 136 and the conical diverging portion 140.

The ratio of the throat area "$A_t$" to the exit area "$A_e$" of each of the ejection passages 132 or 190 is preferably about 1.01–2.10:1 and in the instant example being about 1.09:1. This relationship is expressed in equation form:

$$\frac{A_e}{A_t} = \frac{\left(\frac{2}{\gamma+1}\right)^{1/\gamma-1} \left(\frac{\gamma-1}{\gamma+1}\right)^{\frac{1}{2}}}{\left(\frac{P^1}{P}\right)^{1/\gamma} \left[1 - \left(\frac{P^1}{P}\right)^{\frac{\gamma-1}{\gamma}}\right]^{\frac{1}{2}}}$$

wherein:

$\gamma$ = the specific heat ratio of the prechamber 52 product.

$P^1$ = the pressure value in the main combustion chamber 32 at maximum prechamber 52 pressure P.

P = the stagnation pressure on the upstream side of the throat 136 (or the pressure within the prechamber 52 in this instance).

Operating at an area ratio $A_e/A_t$ above 2.1 to 1 causes oblique shock waves to form in the vicinity of the exit area "G". A normal shock wave will form in the conical diverging portion 140 if $P_e$ becomes less than $P_1$ causing subsonic flow of the burning gases into the main combustion chamber 28. The axial length of the conical diverging portion 140 is preferably more than twice the throat diameter "F".

Exemplary operation will now be described with respect to the first embodiment shown in FIGS. 1–6. In operation, during the intake phase of the Otto cycle, piston 20 is traveling downward in the bore 34, inlet valves 40 are open, exhaust valves 42 are closed, and a lean combustible mixture such as methane with an air to fuel ratio of approximately 21 to 1, is admitted into the main combustion chamber 28. Simultaneously, the ball check 166 of the third control valve means 160 is urged downwardly by the fuel pressure in the passages 148 and 156 and into the open mode position admitting fuel directly into the prechamber 52.

During the compression phase, the inlet valves 40 are closed, the exhaust valves 42 are closed and the combustible mixture and the fuel in the prechamber 52 are compressed by the upwardly traveling piston 20. The rising pressure acts on the ball check 66 causing it to move upwardly to the closed mode position against the conical seat 168 preventing gas flow from the prechamber 52 to the fuel source. During the compression phase a portion of the very lean combustible mixture from the main combustion chamber 28 passes radially inwardly through the ejection passage 132 diluting the volume of fuel in the prechamber 52 forming a more nearly stoichiometric mixture immediately adjacent the electrode 180, so that the mixture is more readily ignitable. This helps ensure more consistent ignition and substantially eliminates misfire within the prechamber.

Preferably, the volume of the prechamber 52 is about 2 to 5% of the total uncompressed volume of the main combustion chamber, and in this specific instance the prechamber volume is approximately 3%. A volume of about 2% insures a sufficient fuel mass for a robust ignition, while a volume more than about 5% will undesirably increase the level of $NO_x$ produced by the engine 12.

During the power or expansion phase of the Otto cycle, the inlet valves 40 and exhaust valves 42 are closed, the pressure in the prechamber 52 maintains the ball check 166 upwardly into a sealed engagement with the conical seat 168 and the fuel mixture in the prechamber 52 is ignited by the spark plug 178 before the piston 18 reaches its top dead center (TDC) position as shown in FIG. 6, causing a rapid gas pressure rise in the prechamber.

The eight ejection passages 132, direct and controllably expand the burning gasses as flamefronts from the prechamber 52 completely across the main combustion chamber 28. The evenly spaced ejection passages effect rapid penetration into the main combustion chamber and more complete combustion, resulting in reduced hydrocarbon levels, low $NO_x$ levels, more stable operation and a broader operating margin. It is recognized that there could be more or less of the ejection passages dependent upon specific engine and fuel characteristics to achieve complete and thorough combustion.

The flamefronts are advantageous because they have a substantial hot surface area that can ignite even extremely lean or diluted combustible mixtures in a repeatable manner. The equally peripherally spaced ejection passages 132 spray the burning gases in uniform geometric patterns at a velocity greater than the speed of sound into the main combustion chamber 28. The hot burning gases penetrate throughout the dense combustible mixture in the main combustion chamber and thereby provide multiple ignition sources in order to achieve thorough combustion of the remote regions ahead of flame front propagation. In order to prevent preignition it is necessary for the flame propagation to rapidly reach the outer remote regions of the main combustion chamber adjacent cylinder wall 34 before preignition occurs.

The surfaces of the 138, 142, and 194 of the ejection passages 132 and 190 are smooth throughout, as the velocity of the expanding and burning gases would decrease as wall friction increases. Surface protrusions and/or imperfections such as machining marks or burrs decreases ejection passage filling efficiency and mass flow capabilities.

The angle "E" for ejection passages 132 and 190 is determined by the piston location verses flamefront propagation to effect burning of the lean burn fuel mixture at the cylinder walls 34.

In order to achieve optimum mixing of the lean fuel-/air mixture from the main combustion chamber 28 with the very rich fuel in the prechamber 52 for essentially complete burning of the mixture with no misfires, and for enhancing the flow of the combustion product gases into the ejection passages 132, 190 the cross-sectional area of diameter "B" of the tubular body 54 is preferably between 3 to 6.5 times greater than the cross-sectional area of diameter "C", the intermediate conical surface 78 is inclined in cross-section at a preselected angle "D" with respect to the central axis 50 of not less than 25 degrees, and the axial length of the lower internal surface 82 above the internal surface 94 of the end wall 92 is between preferably about two and four times the length of the radius 86 of diameter "C". Advantageously, as the lean fuel/air mixture is compressed in the main chamber 28 and forced through the ejection passages 130, 190 into the prechamber 52, turbulence is induced in the flow due to the area expansion between the reduced diameter "C" and the larger diameter "B". The electrode 180 is located relatively close to or adjacent the ejection passages 130 and below the majority of the entrained prechamber 52 volume. This location allows use of a "burn up, blow down" combustion to accomplish complete combustion of the substantially stoichiometric mixture in the prechamber. It is theorized that, a bluntly shaped flamefront propagates upwardly in the prechamber while the burning gases rapidly expand and travel downwardly and radially outwardly through the ejection passages as a result of the optimally robust pressure value "P" centrally within the prechamber. The combustion product gases are funneled into diameter "C" by the conical converging surface 78. Significantly, due to the decrease in cross-sectional area from diameter "B" to diameter "C", the velocity of the burning combustion gases is increased prior to entering the ejection passages 132, with the velocity increase being proportional to the ratio of the cross-sectional areas of diameters "B" and "C".

The cross-sectional area of the diameter "C" is preferably approximately 1.25 to 1.75 times greater than the combined cross-sectional area of the eight throat diameters "F" to prevent restriction of the gas flow from the prechamber 52 into the ejection passages 132.

To reduce surface friction within the prechamber 52 that could effect the mixing, the combustion and the flow of the burning gases the internal surfaces 74, 78, 82, 84, 88, 90, 94, and 100 are preferably relatively smooth surfaces. Also, intermediate surface 78 is connected to the upper surface 74 and to the lower surface 82 respectively by smoothly blending annular transition zone surfaces 88 and 90, thus there are no sharp corners or pockets along the axial length of the prechamber 52 that could interrupt flow or thermal transfer resulting in hot spots causing autoignition.

During the exhaust phase of the Otto cycle, the inlet valves 40 remain closed and the exhaust valves 42 are opened. The product of combustion within the main combustion chamber 28 is evacuated through the exhaust valves 40 by upward movement of the piston 20. The pressure within the main combustion chamber 28 and the prechamber 52 created by upward movement of the piston 20 maintains the ball check 166 against conical seat 168.

While the operation of the fuel combustion system 10 has been explained primarily with respect to FIGS. 1–6 it is apparent that the principles are equally applicable to the alternative embodiment of FIGS. 7 and 8. In the alternate embodiment, however, the surface 194 of the conical diverging portion 192 is inclined in cross-section at a preselected angle "H" with respect to the central axis 134. The converging inlet surface 194 enhances throat portion 136 filling characteristics by funneling and directing the flow of the combustion gases into the throat portion, and prevents erosion of the upstream side of the throat portion.

In summary, it can be appreciated that the fuel combustion system 10 provides faster and more complete combustion within the main combustion chamber 28. The prechamber 52 has a preselected geometric shape and volume for more efficient burning of the very lean fuel mixture 26 in the main combustion chamber 28. The plurality of ejection passages 132 and 190 have a preselected geometric profile in communication with the prechamber 52 for directing and controllably expanding the burning gases from the prechamber 52 at a velocity greater than the speed of sound. Moreover, the arrangement takes advantage of the pressure ratio between the prechamber 52 and the main combustion chamber 28 converting the enthalpy decrease through an isentropic expansion to an increase in kinetic energy through the ejection passage means 130.

Other aspects, objects, and advantages of this invention can be obtained from a study of the drawings, the disclosure, and the appended claims.

I claim:

1. In a fuel combustion system for a gas engine defining a main combustion chamber above a reciprocating piston and a precombustion chamber assembly in communication therewith, defining a prechamber, and igniting means for igniting a mixture of gaseous combustible fuel and air in the prechamber and forming expanding burning gases, wherein the improvement comprises:
   ejection passage means defining by the precombustion chamber assembly, the ejection passage means includes a plurality of ejection passages of a preselected geometric cross-section in communication with the prechamber for directing and controllably expanding the burning gases from the prechamber into the main combustion chamber at a velocity greater than the speed of sound.

2. The fuel combustion system of claim 1 wherein the precombustion chamber assembly includes a nozzle member having a central axis.

3. The fuel combustion system of claim 2 including a piston having a central axis axially aligned with the central axis of the nozzle member.

4. The fuel combustion system of claim 1 wherein the prechamber has a preselected volume and the main combustion chamber has a preselected uncompressed volume with the volume of the prechamber being about 2 to 5% of the uncompressed volume of the main combustion chamber.

5. The fuel combustion system of claim 4 wherein the volume of the prechamber is 3% of the uncompressed volume of the main combustion chamber.

6. The fuel combustion system of claim 2 wherein the nozzle member defines the ejection passage means.

7. The fuel combustion system of claim 6 wherein the ejection passages individually have a central axis and a preselected length.

8. The fuel combustion system of claim 7 wherein the central axis of the individual ejection passages is inclined at a preselected angle with respect to the central axis of the nozzle of between approximately 65 and 85 degrees.

9. The fuel combustion system of claim 7 wherein there are eight equally peripherally spaced radial ejection passages.

10. The fuel combustion system of claim 7 wherein each ejection passage includes a throat portion having a generally cylindrical internal surface defining a throat diameter having a preselected cross-sectional area and a conical outwardly diverging portion having a preselected length and a conical internal surface defining an exit diameter having a preselected cross-sectional area.

11. The fuel combustion system of claim 10 wherein the ratio of the preselected cross-sectional area of the throat to the preselected cross-sectional area of the exit diameter is preferably about 1.01–2.10:1.

12. The fuel combustion system of claim 10 wherein the ratio of the preselected cross-sectional area of the throat to the preselected cross-sectional area of the exit diameter is 1.09:1.

13. The fuel combustion system of claim 10 wherein the preselected length of the conical diverging portion is preferably more than twice the throat diameter and less than 85% of the preselected length of the ejection passage.

14. The fuel combustion system of claim 10 wherein the cylindrical internal surface and the conical internal surface have a surface texture roughness average (Ra) of about 0.80 micrometers.

15. The fuel combustion system of claim 7 wherein the ejection passages include a converging inlet portion having an internal surface defining a preselected angle with respect to the central axis of the ejection passages, a throat portion having a generally cylindrical internal surface defining a throat diameter having a preselected cross-sectional area and a conical outwardly diverging portion having a preselected length and a conical internal surface defining an exit diameter having a preselected cross-sectional area.

16. The fuel combustion system of claim 15 wherein the preselected angle of the internal surface with respect to the central axis of the ejection passages is preferably between 15 and 30 degrees.

17. The fuel combustion system of claim 15 wherein the preselected angle of the internal surface with respect to the central axis of the ejection passages is approximately 19 degrees.

18. The fuel combustion system of claim 15 wherein the ratio of the preselected cross-sectional area of the throat to the preselected cross-sectional area of the exit diameter is preferably about 1.01–2.10:1.

19. The fuel combustion system of claim 15 wherein the ratio of the preselected cross-sectional area of the throat to the preselected cross-sectional area of the exit diameter is 1.09:1.

20. The fuel combustion system of claim 15 wherein the preselected length of the conical diverging portion is preferably more than twice the throat diameter and less than 85% of the preselected length of the ejection passage.

21. The fuel combustion system of claim 15 wherein the converging inlet surface, the cylindrical internal surface and the conical internal surface have a surface texture roughness average (Ra) of about 0.80 micrometers.

22. The fuel combustion system of claim 2 wherein the nozzle member includes a tubular body defining an upwardly open cavity, the cavity includes an upper tubular wall of a predetermined radial thickness having an internal cylindrical surface, an intermediate tubular wall of downwardly increasing sectional thickness having an internal generally conical converging surface and a lower tubular wall of a significant radial thickness greater than the predetermined radial thickness of the upper tubular wall having an internal reduced diameter cylindrical surface.

23. The fuel combustion system of claim 22 wherein the internal cylindrical surface, the internal generally conical converging surface, and the internal reduced diameter cylindrical surface have a surface texture average of about 0.80 micrometers.

24. The fuel combustion system of claim 22 wherein the internal cylindrical surface, the internal generally conical converging surface, and the internal reduced diameter cylindrical surface are surfaces of revolution about the central axis.

25. The fuel combustion system of claim 22 wherein the internal cylindrical surface defines a diameter having a first preselected cross-sectional area and the reduced diameter cylindrical surface defines a diameter having a radius "R" and a second preselected cross-sectional area, the first preselected cross-sectional area being preferably 3 to 6.5 times greater than of the second preselected cross-sectional area.

26. The fuel combustion system of claim 25 wherein the internal reduced diameter cylindrical surface has a preselected length, with the preselected length being preferably between two and four times the length of the radius "R".

27. The fuel combustion system of claim 22 wherein the internal generally conical converging surface is inclined in cross-section at a preselected angle with respect to the central axis of the nozzle member of not less than 25 degrees.

28. The fuel combustion system of claim 22 wherein the tubular body has a lower distal end wall having an internal surface, the end wall closing the cavity.

29. The fuel combustion system of claim 28 wherein the internal surface has a surface texture roughness average of about 0.80 micrometers.

30. The fuel combustion system of claim 25 wherein the ejection passage means includes a plurality of ejection passages, each ejection passage includes a throat portion having a generally cylindrical internal surface defining a throat diameter having a preselected cross-sectional area, the second preselected cross-sectional area is preferably approximately 1.25 to 1.75 times greater than the combined sum of the preselected cross-sectional areas of the throat diameters.

31. The fuel combustion system of claim 22 wherein the igniting means includes a spark plug having an electrode and a radial passage is formed in the tubular body elevationally substantially at the juncture of the upper tubular wall and the intermediate tubular wall with the electrode exposed to the prechamber by way of the passage.

32. The fuel combustion system of claim 1 wherein the the precombustion chamber assembly includes a head member and a generally closed tubular nozzle member that cooperate in their assembled position to form the prechamber.

33. The fuel combustion system of claim 32 wherein the head member includes control valve means for admitting a gaseous fuel from a source to the prechamber.

34. The fuel combustion system of claim 33 wherein the control valve means includes a check valve assembly, the check valve assembly including a free-floating ball check having an open mode position permitting the flow of the fuel to the prechamber and a closed mode position preventing gas flow to the prechamber.

35. In a fuel combustion system for a gas engine capable of burning a relatively lean combustible mixture of gaseous fuel and air and defining a main combustion chamber above a reciprocating piston and a precombustion chamber assembly including a head member and a nozzle member cooperatively defining a prechamber, a separate source of a gaseous fuel for the prechamber, and igniting means for igniting a mixture of gaseous fuel and air admitted to the prechamber and forming expanding burning gases, wherein the improvement comprises:
the nozzle member defining a plurality of geometric profiled ejection passage means for directing and controllably expanding the burning gases as flame-fronts from the prechamber into the main combustion chamber at a velocity greater than the speed of sound in order to penetrate and cause ignition and burning of the combustible mixture in the main combustion chamber in multiple locations simultaneously.

36. The fuel combustion system of claim 35 wherein the nozzle member having a central axis, includes a tubular body defining an upwardly open cavity, the tubular body includes a upper tubular wall of a predetermined radial thickness having an internal cylindrical surface, an intermediate tubular wall of downwardly increasing sectional thickness having an internal generally conical converging surface, and a lower tubular wall of a significant radial thickness greater than the predetermined radial thickness of the upper tubular wall, having an internal reduced diameter cylindrical surface.

37. The fuel combustion system of claim 36 wherein the internal cylindrical surface, the internal generally conical converging surface, and the internal reduced diameter cylindrical surface have a surface texture average of about 0.80 micrometers.

38. The fuel combustion system of claim 36 wherein the internal cylindrical surface, the internal generally conical converging surface, and the internal reduced diameter cylindrical surface are surfaces of revolution about the central axis.

39. The fuel combustion system of claim 36 wherein the internal cylindrical surface defines a diameter having a first preselected cross-sectional area and the internal reduced diameter cylindrical surface defines a diameter having a radius "R" and a second preselected cross-sectional area, the first preselected cross-sectional area being preferably 3 to 6.5 times greater than of the second preselected cross-sectional area.

40. The fuel combustion system of claim 39 wherein the tubular body includes a lower distal end wall having an internal surface, the end wall closing the cavity, and the internal reduced diameter cylindrical surface having an axial length, the axial length of the internal reduced diameter cylindrical surface is preferably between two and four times the length of radius "R" above the internal surface of the end wall.

41. The fuel combustion system of claim 36 wherein the internal generally conical converging surface is inclined in cross-section at a preselected angle with respect to the central axis of the nozzle member of not less than 25 degrees.

42. The fuel combustion system of claim 36 wherein the tubular body has a lower distal end wall having an internal surface, the end wall closing the cavity.

43. The fuel combustion system of claim 39 wherein the ejection passage means includes a plurality of ejection passages, each ejection passage having a preselected length includes a throat portion having a generally cylindrical internal surface defining a throat diameter having a preselected cross-sectional area, the second preselected cross-sectional area of the diameter defined by the internal reduced diameter cylindrical surface is preferably approximately 1.25 to 1.75 times greater than the combined sum of the cross-sectional areas of the throat diameters.

44. The fuel combustion system of claim 36 wherein the igniting means includes a spark plug having an electrode and a radial passage is formed in the tubular body elevationally between the first wall and the second wall with the electrode exposed to the prechamber by way of the passage.

45. The fuel combustion system of claim 43 wherein each ejection passage further includes a conical outwardly diverging portion having a preselected length and a conical internal surface defining an exit diameter having a preselected cross-sectional area.

46. The fuel combustion system of claim 45 wherein the ratio of the preselected cross-sectional area of the throat to the preselected cross-sectional area of the exit diameter is preferably about 1.01–2.10:1.

47. The fuel combustion system of claim 45 wherein the ratio of the preselected cross-sectional area of the throat to the preselected cross-sectional area of the exit diameter is 1.09:1.

48. The fuel combustion system of claim 45 wherein the preselected length of the conical diverging portion is preferably more than twice the throat diameter and less than 85% of the length of the ejection passage.

49. The fuel combustion system of claim 35 wherein the ejection passage means includes a plurality of ejection passages, each ejection passage having a preselected length includes converging inlet portion having an internal surface defining a preselected angle with respect to the central axis, a throat portion having a generally cylindrical internal surface defining a throat diameter having a preselected cross-sectional area and a conical outwardly diverging portion having a preselected length and a conical internal surface defining an exit diameter having a preselected cross-sectional area.

50. The fuel combustion system of claim 49 wherein the preselected angle of the internal surface with respect to the central axis of the ejection passages is approximately 19 degrees.

51. The fuel combustion system of claim 49 wherein the ratio of the preselected cross-sectional area of the throat to the preselected cross-sectional area of the exit diameter is preferably about 1.01–2.10:1.

52. The fuel combustion system of claim 49 wherein the preselected length of the conical diverging portion is preferably more than twice the throat diameter and less than 85% of the preselected length of the ejection passage.

53. A nozzle member for a precombustion chamber assembly of an engine comprising:
   a tubular body having a central axis defining a cavity and including in generally serially related order, an internal cylindrical surface, an internal generally conical converging surface, an internal reduced diameter cylindrical surface, and a distal end wall having an internal surface connected in closing relation to the third internal surface; and
   the tubular body defining a plurality of ejection passages of a preselected geometric profile individually having a preselected length and a central axis, each ejection passage including a throat portion and an outwardly diverging portion having a preselected length.

54. The nozzle member of claim 53 wherein the internal cylindrical surface, the internal generally conical converging surface, and the internal reduced diameter cylindrical surface are surfaces of revolution about the central axis.

55. The nozzle member of claim 53 wherein the internal cylindrical surface defines a diameter having a first preselected cross-sectional area and the internal reduced diameter cylindrical surface defines a diameter having a radius "R" and a second preselected cross-sectional area, the first preselected cross-sectional area being preferably 3 to 6.5 times greater than of the second preselected cross-sectional area.

56. The nozzle member of claim 55 wherein the internal reduced diameter cylindrical surface has a preselected length, with the preselected length being preferably between two and four times the length of the radius "R".

57. The nozzle member of claim 53 wherein the internal generally conical converging surface is inclined in cross-section at a preselected angle with respect to the central axis of the nozzle member of not less than 25 degrees.

58. The nozzle member of claim 55 wherein the throat portion includes a generally cylindrical internal surface defining a throat diameter having a preselected cross-sectional area, the second preselected cross-sectional area is preferably approximately 1.25 to 1.75 times greater than the combined sum of the preselected cross-sectional areas of the throat diameter.

59. The nozzle member of claim 58 wherein the outwardly diverging portion includes a conical internal surface defining an exit diameter having a preselected cross-sectional area.

60. The nozzle member of claim 59 wherein the ratio of the preselected cross-sectional area of the throat to the preselected cross-sectional area of the exit diameter is preferably about 1.01–2.10:1.

61. The nozzle member of claim 59 wherein the preselected length of the conical diverging portion is preferably more than twice the throat diameter and less than 85% of the preselected length of the ejection passage.

62. A precombustion chamber assembly adapted or use in an engine, comprising:
   a prechamber of a preselected geometric shape and volume adapted when in use for igniting a combustible mixture therein; and
   a plurality of ejection passages individually having a central axis defined in the precombustion chamber assembly, each ejection passage having a preselected length including a throat portion having a generally cylindrical internal surface defining a throat diameter having a preselected cross-sectional area and a conical outwardly diverging portion having a preselected length and a conical internal surface defining an exit diameter having a preselected cross-sectional area, the ejection passages being of a construction sufficient for directing and controllably expanding the burning gases from the prechamber at a velocity greater than the speed of sound.

63. The precombustion chamber assembly of claim 62 wherein the ratio of the preselected cross-sectional area of the throat to the preselected cross-sectional area of the exit diameter is preferably about 1.01–2.10:1.

64. The precombustion chamber assembly of claim 62 wherein the preselected length of the conical diverging portion is preferably more than twice the throat diameter and less than the length of the ejection passage.

65. The precombustion chamber assembly of claim 62 wherein the ejection passages include a converging inlet portion having an internal surface defining a preselected angle with respect to the central axis of preferably between 15 and 30 degrees.

66. A method of burning a predetermined relatively lean combustible mixture of gaseous fuel and air in an engine including a main combustion chamber, a precombustion chamber assembly defining a prechamber and a plurality of ejection passages in communication with the prechamber, the precombustion chamber assembly includes a nozzle member, the nozzle member includes a tubular body defining an upwardly open cavity, the cavity includes an upper tubular wall of a predetermined radial thickness having an internal cylindrical surface defining a diameter, an intermediate tubular wall of downwardly increasing sectional thickness having an internal generally conical converging surface and a lower tubular wall of a significant radial thickness greater than the predetermined radial thickness of the upper tubular wall having an internal reduced diameter cylindrical surface defining a diameter, a valve assembly for admitting a gaseous fuel from a separate source to the prechamber, and igniting means for igniting a mixture of gaseous fuel and air in the prechamber comprising the steps of:
   (a) admitting the relatively lean combustible mixture into the main combustion chamber;
   (b) opening the valve assembly admitting the gaseous fuel into the prechamber;
   (c) progressively compressing the relatively lean combustible mixture in the main combustion chamber and the gaseous fuel in the prechamber by upward travel of a piston, automatically closing the valve assembly, and forcing a portion of the relatively lean combustible mixture radially inwardly through the ejection passages;
   (d) igniting the fuel mixture in the prechamber forming expanding burning gases, the burning gases being funneled into the diameter defined by the reduced diameter cylindrical surface from the diameter defined by internal cylindrical surface by the conical converging surface; and
   (e) controllably directing the burning gases from the prechamber and into the main combustion chamber via the plurality of ejection passages at a velocity greater than the speed of sound forming evenly spaced radially outwardly flamefronts which penetrate and cause ignition and burning of the lean combustible mixture in the main combustion chamber in multiple locations simultaneously.

67. The method of burning a predetermined relatively lean combustible mixture of gaseous fuel and air in an engine of claim 66 wherein the internal cylindrical surface defines a diameter having a first preselected cross-sectional area and the internal reduced diameter cylindrical surface defines a diameter having a second preselected cross-sectional area, the preselected cross-sectional area being preferably 3 to 6.5 times greater than the second preselected cross-sectional area.

68. The method of burning a predetermined relatively lean combustible mixture of gaseous fuel and air in an engine of claim 67 wherein the velocity of the burning gases is increased prior to entering the ejection passages, with the increase being proportional to the ratio of the first and second cross-sectional areas.

* * * * *